United States Patent Office 3,007,798
Patented Nov. 7, 1961

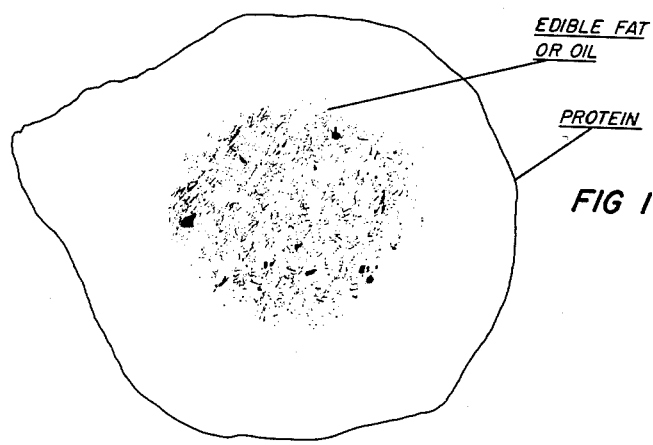
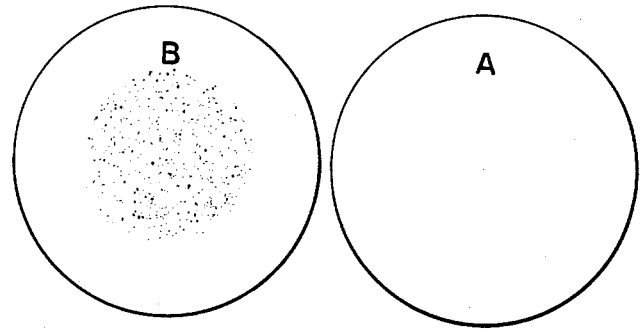
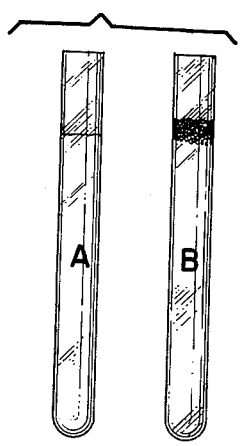

3,007,798
STORAGE STABLE CORN POWDER AND THE PRODUCTION THEREOF
Shinshiro Ohtaki, % Kenjiro Otaki, 134 Tamagawa-Yogamachi-1-chome, Setagaya-ku, Tokyo, Japan
Filed Oct. 26, 1959, Ser. No. 848,623
Claims priority, application Japan Aug. 5, 1959
8 Claims. (Cl. 99—124)

This invention relates to a corn powder and the preparation thereof. Also it is concerned with a corn powder composition which can provide tasty corn soup by impromptu cooking. More particularly, the corn powder to which the invention relates and which is claimed therein, may be prepared by grinding unripe sweet corn, filtering the ground mass to remove epidermis thereof and other undesirable materials, mixing the filtrate with edible oils together with or without a suitable emulsifier, or a mixture of emulsifiers of different kind while stirring and, if desired, homogenizing, to form an oil-in-water type emulsion, and then spray-drying the resulting emulsion.

Varieties of corn involve dent corn, flint corn, sweet corn, etc., and their use may depend on a particular corn chosen. In general, the former two may be employed as raw corn starch material, common foodstuff or animal feed, and the last one is mainly used for cooking dishes. Sweet corn which is such as used herein has the representative two species, Goldencross Bantam and Country Gentleman, and it is as well known a nutritious stuff comprising a relatively poor fat, enriched protein and amylaceous materials, as well as vitamines such as vitamin A, $B_1$, $B_2$ and C, and niacin (nicotinic amide). In marked contrast with dent corn or flint corn which both would be harvested in their completely ripened state, unfortunately sweet corn can not be stored under the condition as it is, since the sweet corn which has been harvested in the unripe state will have a sugar content decreased and an amylaceous content increased during storage to loss suitability for cookery depending on the taste or flavors of corn.

Sweet corn should be preferably harvested at the time of about ten or twenty-five days after silking. If harvested at the earlier period, the sweet corn will be soft, strongly sweet, but has a poor flavor and is in want of a good body. On the other hand, when sweet corn is harvested at the more ripened stage, it is somewhat hard and has a poor sweetness and a bad flavor. For the most suitable way, conclusively, sweet corn should be harvested at the period of about ten to twenty-five days after silking and immediately thereafter canned or subjected to rapid refrigeration. In particular cases according to the planting time it is, however, preferred that sweet corn be harvested fifteen to thirty-five days after silking.

Now typical changes of the composition of sweet corn during ripening will be shown in Table 1:

TABLE 1

|  | After silking | | |
|---|---|---|---|
|  | Ca. 10-14 days | Ca. 15-20 days | Ca. 21-25 days |
| Water content, gr | 80.3 | 72.4 | 65.7 |
| Protein | 2.9 | 3.7 | 4.5 |
| Fat | 0.8 | 1.1 | 1.8 |
| Ash content | 0.56 | 0.8 | 1.0 |
| Carbohydrate | 15.4 | 22.0 | 27.0 |
| Fibre | 0.6 | 0.9 | 0.8 |
| Cane sugar | 5.2 | 4.0 | 3.2 |
| Starch | 8.7 | 16.1 | 21.6 |

From the above data it is seen that in accordance with the progress of ripening a water content is decreased and total solids are increased, and that among solid constituents, protein and cane sugar contents are decreased while a starch content is increased.

The change of a sugar content in sweet corn during storage (said change being evaluated by percent of sugar loss in weight on the basis of the initial sugar amount contained) will be illustrated in Table 2 and Table 3,

TABLE 2.—LOSS OF TOTAL SUGARS

| Time of storage, hours | Temperature for storage | | | | |
|---|---|---|---|---|---|
|  | 0° C. | 10° C. | 20° C. | 30° C. | 40° C. |
|  | Percent | Percent | Percent | Percent | Percent |
| 24 | 8.12 | 16.93 | 25.61 | 50.28 | 45.79 |
| 48 | 14.51 | 27.95 | 45.73 | 57.09 | 60.15 |
| 72 | 18.03 | 38.71 | 55.50 | 59.00 | 62.15 |
| 96 | 22.00 | 49.22 | 62.10 | 61.84 |  |

TABLE 3.—LOSS OF CANE SUGAR

| Time of storage, hours | Temperature for storage | | | | |
|---|---|---|---|---|---|
|  | 0° C. | 10° C. | 20° C. | 30° C. | 40° C. |
|  | Percent | Percent | Percent | Percent | Percent |
| 24 | 3.51 | 20.78 | 31.05 | 59.42 | 51.03 |
| 48 | 10.39 | 37.49 | 56.12 | 66.56 | 64.68 |
| 72 | 15.08 | 47.46 | 64.22 | 68.56 | 69.24 |
| 96 | 21.25 | 60.54 | 70.16 | 70.19 |  |

The above tables indicate that during storage, sugars contained in sweet corn readily change to starch. Such change may be remarkable in the case when corn grains which has been removed from their cob are stored. In order to avoid a considerable loss of sugars, the corn should be stored at a low temperature in a gaseous medium of 43 to 47% carbon dioxide. Because of the above mentioned changeability, the corn should be harvested at a suitable period indicated and immediately thereafter canned or refrigerated thereby to maintain a special taste of the corn.

In the accompanying drawing, FIG. 1 shows the microscopic photograph (magnification 300×) of the corn powder particles produced by the invention; and FIG. 2 and FIG. 3 show the photographs of samples A and B which have been subjected to comparative tests, the former of said samples being a corn powder produced by the invention and the latter being control.

In accordance with the present invention, sweet corn which has been harvested 10-25 days after silking is ground into a cream; the cream is filtered to remove epidermis of the corn and other unground materials; the resulting filtrate is added with an edible fatty material and then emulsified; and thereafter the thus formed emulsion is dried in a manner of spray drying. More detailedly, sweet corn which has been harvested 10-25 days after silking is separated from the cob and then ground by means of a suitable milling machine; the ground mass is filtered by a cloth bag or other suitable filtering means thereby to remove the epidermis and other unground materials; and then the filtrate is stirred and heated up to 70°-80° C. thereby to effect sterilization while starch is solubilized. When a canned sweet corn is used as starting material, the ground mass after separating from unground materials should be sterilized at a temperature of from 60°-65° C. During the sterilization or thereafter a certain type of edible fatty materials is poured into the mass in an emulsifier to form an emulsion. The term "fatty material" used herein means well known fats and fatty oils, including beef fat, pork fat and butter fat, and animal and vegetable oils; and in the present invention either a liquid oil or a solid fat may be similarly used with a satisfactory result. Sometimes an antioxidant and/or an emulsifying agent may be used together with said fatty material. Depending on the efficiency of an emulsifier used, it is more desirable to homogenize an emulsion by means of a homogenizer to have the particle size of fatty material of less than 50–60 microns. The thus formed emulsion which is an oil-in-water type emulsion is dried in a spray dryer to produce a desired corn powder. If the viscosity of an emulsion to be spray-dried is too high because the insufficient water of the emulsion, additional water should be supplied thereto to have an approximately 70%, viscosity thereby to secure easy spraying. Of course, other methods for drying except spray drying can be also employed. According to a method of the present invention, the fat particles present are individually coated with a film composed of protein and amylaceous materials contained in the corn, and as the result, a corn powder produced can be stably stored for a long period without loss of a good taste, because the powder is substantially completely free from oxidation of the fatty material added. Furthermore, it should be noted that according to the invention corn powder, which heretofore has been known only as produced from canned sweet corn, now can be readily produced from either raw or canned sweet corn. In addition, a commercially available sweet corn, so called "Dutch Delight" dry sweet corn and white corn also can be used as starting corn material in the invention.

Generally speaking, foodstuff usually contains fat more or less in amount, and from the view point of nutrition or gustation it is rather preferred that such foodstuff as containing the less amount of fat is added with a required amount of fat. Under inadequate conditions, however, fat will cause acidic putrefaction to degrade a foodstuff itself. Such putrefaction can not be avoided by having a common edible oil as it is adsorbed to wheat flour or corn flour.

In the present invention which regards to an improvement in the above said defect, corn which is in short of fat is added with fat, which is stabilized by coating the particles thereof with film-forming materials contained in the corn, such as protein or amylaceous materials. Since protein that is one of the film-forming materials will decrease in its amount in corn following ripening of the corn, it is of the more advantage that young corn is used as raw material in the present invention. A corn powder produced in accordance with the invention never suffers from the leakage of oil contained or oxidative putrefaction with atmospheric oxygen. And accordingly it can be readily stored for a long period of time in a moisture-proofed container.

As to the mechanism by which the particle surface of an edible fatty material is coated with colloidal substances such as protein and starch contained in sweet corn, it may be supposed that when the fatty material is dispersed in an aqueous solution of the colloidal substances to form an oil-in-water type emulsion and thereafter sprayed into a drying zone into which hot air is introduced, moisture coming from the aqueous solution held on and around the fine particles of the fatty material is vaporized while protein and starch are dried on the surface of said particles to form a film. By the phase-contrast microscopic observation it can be seen that the above said particles are individually surrounded by a film coat. In this stage, to say for the precaution's sake, it is not required to add a considerably large amount of fatty material, but rather preferred to use the fatty material in such amount as not adversely affecting to the taste of corn, for example from 10% up to 50% by weight. Of course, if the enrichment of vitamins is desirable, fat-soluble vitamins should be added to fatty material and water-soluble one should be added to a corn emulsion.

Preferably the fatty particles of the emulsion before drying should be in size of less than about 30 microns. It is most convenient for spraying to have the moisture content of the emulsion within a range of from about 65 to 75%. The temperature of hot air introduced into a drying chamber may be 130°–180° C. The fineness of a corn powder resulting from drying may vary depending on the following conditions:

(1) Moisture content in an emulsion, that is viscosity;
(2) Circumferential speed of a disc in a spray-dryer;
(3) Diameter of nozzle holes in a spray-dryer; and
(4) Injection pressure.

When an oil-in-water type emulsion of a relatively low viscosity is spray-dried, a considerably higher circumferential speed of a disc or a small diameter of nozzle holes and a higher injection pressure should be employed to secure the production of a highly fine powder. Although a corn powder which has an extreme fineness will show the less dispersibility in water as compared with that which has a moderate fineness, such decrease of dispersibility may be successfully improved by adding a highly hydrophilic emulsifying agent, for example sucrose monostearate, at the time when a creamy sweet corn and an edible fatty material are mixed.

Although an oil-in-water type emulsion to be sprayed may be such one containing more than 70% of oil as in mayonnaise, such high oil content is not necessary in this invention. In the preparation of an oil-in-water type emulsion, moreover, it is more convenient that the external layer that is a continuous phase has the greater amount than that of the internal layer that is a dispersion phase, and the higher viscosity of an emulsion will make spray-drying more difficult. Accordingly, it is desirable that an oil-in-water type emulsion to be subjected to spray-drying in the invention has total water content of 65–75% and that fatty material is mixed with four or more than times amount of sweet corn inclusive water.

A corn powder produced herein may have the following components, the proportion of which may vary depending on the particular type of a sweet corn used and the harvest time of said corn, as typically shown in table.

TABLE 4

| | Percent |
|---|---|
| Water | 2.50 |
| Protein | 7.26 |
| Fats and fatty oils | 31.02 |
| Ash | 2.91 |
| Carbohydrates | 56.31 |
| Fibre | 1.14 |
| Cane sugar | 9.69 |
| Starch | 45.48 |

As stated hereinbefore, a corn powder produced in the invention does not suffer from oil leakage even at high temperatures so far as it is kept in dry state. However it may be well dispersed in warm water (40°–50° C.) to a cream, without the separation of oily component, which would be easily separated thereby to float out in the form of beadlet by adding with warm water if said oily component were merely adsorbed with protein or starch.

In order to prove the desirable characteristics of a corn powder produced from sweet corn according to a process of the invention, the comparative tests mentioned below were carried out.

Sample A was prepared by emulsifying the mixture of 100 parts by weight of a creamy sweet corn (moisture content ca. 75%) and 10 parts by weight of hardened cotton seed oil (M.P. 37° C.) and then spray-drying the resulting emulsion to form a powder. This sample contained 2.5% of water and 27.9% of fatty material.

Sample B was prepared by mixing 721 parts of a powder, which has been produced by directly spray-drying the same sweet corn as of sample A, with 279 parts of hardened cotton seed oil (M.P. 37° C.), letting the mixture stand in a thermostat at 80° C. for 15 minutes, cooling it with stirring and then pulverizing to powder. (But the powder produced was not so dry, fine powder.)

Then the above samples A and B were used in the following tests.

Test 1.—Two grams of each of samples A and B were placed in the form of a circular area with a diameter of about 5 cm. on a filter paper with a diameter of 15 cm., letting stand in a thermostat at 100° C. for one hour, and then removed from the thermostat. As seen from the photograph of FIG. 2, sample A did not show any oil-leakage, but sample B showed severe oil-leakage.

*Test 2.*—To test tubes, 2 gr. of each of samples A and B were charged and then 18 gr. of water were added thereto respectively. The mixtures were heated on a water bath. As seen from the photograph of FIG. 3, it was observed that in the case of sample A no fatty material was separated, but in the case of sample B, the fatty material contained was separated to float out in top layer.

In Test 1 it is indicated that the fatty material contained sample A was coated with a film essentially composed of protein and starch, and in Test 2, it is clearly indicated that the fat particles of sample A, because they were individually coated with a film layer, could be dispersed in water to form a stable emulsion without causing the separation of the fatty material.

A corn powder in the present invention may be used as the mixture with wheat flour, such mixture being useful in the preparation of fried or baked products, e.g. fritters, cakes and bread. Also the corn powder can provide corn soup of a good taste.

In order for the preparation of rapid cooking corn soup mix, the above corn powder may be intimately mixed with corn starch, skimmed milk, flavors, spices and others (see Example 3). Alternatively whole or one portion of the materials other than corn starch may be added into an emulsion composed of a creamy sweet corn and edible fatty material, and thereafter spray-dried to give a dry powder followed by mixing with corn starch. Sometimes onions may be treated with fat to be added to sweet corn and thereafter ground together with sweet corn thereby to secure the preparation of a tasty corn soup mix due to the transfer of onion flavor into fat particles. In the above cases, if necessary, additional water may be used in such amount as sufficient to dissolve the materials. In still another method, firstly roux is prepared by treating corn starch with edible fat and then mixing with the specified flavors and spices, cooled to a solid state and then powdered, the resulting powder being mixed with a corn powder separately produced by a method of the invention (see Example 4). In the event the corn starch to be treated with fat can be replaced with wheat flour.

While conventional corn soup mix as well known is a mere mixture comprising finely powdered corn and other materials including spices, it should be noted herein that corn soup mix of the invention comprises a corn powder which has been additionally reinforced with an edible fatty material being characterized by coating with the colloidal substances of the corn, together with other materials.

The following examples, which are intended as informative and typical only and not in a limiting sense, will illustrate the invention.

*Example 1*

One hundred kilograms of canned sweet corn having a moisture content of 75% was ground and then strained through a cloth bag to remove husks. The filtrate was charged in an emulsifier and 10 kgr. of hardened cotton seed oil (B.P. 37° C.) was added thereto. The mixture was stirred to form an emulsion, while temperature was kept at about 65° C. for thirty minutes to effect sterilization. The resulting emulsion was passed through a homogenizer to have fat particles with a diameter of less than about 50 microns, and then spray-dried by a pressure injection method using six nozzles with a diameter of 0.4–0.5 mm. under the conditions: injection pressure 140–150 kg./cm.$^2$, injection rate of the emulsion ca. 400 kg./hr., hot air temperature ca. 150° C., and temperature of a drying chamber ca. 80° C. A corn powder thus obtained was found to have a water content of 25%.

*Example 2*

One hundred kilograms of sweet corn seeds (a water content 75%) which had been harvested 18 days after flowering were ground by means of a grind mill to a milky state and then strained through a cloth bag to remove husks. The filtrate was charged into an emulsifier, and heated at about 75°C. for 20 min. to effect sterilization. Then 8 kgr. of butter fat (containing 0.3 gr. of each of BHA and BHT as antioxidants) and 100 gr. of lecithin as emulsifying agent were added thereto, and the mixture was stirred and then homogenized by a homogenizer thereby to form an oil-in-water type emulsion, which was subsequently followed by spray drying under the same conditions as in Example 1 to produce a dry corn powder.

Since there is a difference in the water content of sweet corn itself, it is to be noted that in some cases the amount of water should be optionally adjusted by addition or concentration, depending on the particular material chosen and the method for drying.

*Example 3*

This example shows a typical formulation of corn soup mix containing a corn powder produced in the preceding examples.

| | Percent |
|---|---|
| Corn powder | 40.0 |
| Corn starch | 20.0 |
| Dried skimmed milk | 28.4 |
| Sodium glutamate | 1.5 |
| Onion powder | 3.0 |
| White pepper | 0.1 |
| Granulated sugar | 2.0 |
| Edible salt (sodium chloride) | 5.0 |

The above materials were uniformly mixed in a mixer. The resulting mix was found to show an analytical data:

| | Percent |
|---|---|
| Water | 4.49 |
| Protein | 14.19 |
| Fat | 12.78 |
| Ash | 8.61 |
| Carbohydrate | 59.93 |
| Fibre | 0.96 |

Twenty grams of the corn soup mix were added with 150 cc. of water and then cooked for a short time while stirring thereby to provide corn potage.

The use of dry skim milk (which may be replaced with dried whole milk, skim milk or cow's milk) can improve a taste of soup and at the same time it can enrich such indispensable amino acids as being insufficiently contained in corn, for example lysine, tryptophane, etc. If desired, of course, the corn soup mix may be enriched with vitamins. In this case there is such a particular advantage that oil-soluble vitamins A and D can be prevented from their potency depression, because these vitamins protected by coated film do not come in contact with air.

*Example 4*

| | Kg. |
|---|---|
| Sweet corn (water content ca. 75%) | 300 |
| Dried skim milk | 169 |
| Onion powder | 12 |
| Sucrose monosterate | 1 |
| Hardened cotton seed oil (M.P. 37° C.) | 34 |
| Water | 860 |

A mixture of the above formulation was emulsified and then spray-dried to produce a corn powder. Separately roux was prepared as follows: 17 kgr. of corn starch and 40 kgr. of wheat flour were placed in a plain pan, and then treated (or fried) with 15 kgr. of hardened cotton seed oil at internal temperatures of 120°–140° C.

to such an extend that odor of the wheat flour disappeared or very slightly scorching odor was smelled, while 7 kgr. of granulated sugar, 5 kgr. of edible salt, 15.8 kgr. of sodium glutamate, and 0.2 kgr. of white pepper was added and well mixed immediately before the frying was completed. The resulting mass was cooled and then pulverized. The thus obtained powder was mixed with the aforesaid corn powder in a proportion of from 6:4 to 8:2 to give corn soup mix. Typical corn soup mix comprising the corn powder and the powdered roux in a proportion of 7:3 was found to have the following analytical data:

|  | Percent |
|---|---|
| Water | 3.98 |
| Protein | 18.06 |
| Fat | 12.86 |
| Ash | 9.91 |
| Carbohydrate | 54.43 |
| Fibre | 0.76 |

In the above preparation of corn powder, onion powder may be replaced with raw onion. Suitable ratio of sweet corn to raw onion may be approximately 5:1.

What I claim is:

1. A corn powder containing about 2% to about 5% by weight of water, about 5% to 15% by weight of protein, about 10% to 55% by weight of fat, about 1% to 3% by weight of ash and about 30% to 70% by weight of carbohydrate, and said corn powder being further characterized by that the fat particles contained therein are individually coated with a film consisting essentially of sweet corn, protein and sweet corn amylaceous substance so as not to suffer from oxidative degradation.

2. A method for producing a new, preservable corn powder from unripened sweet corn harvested about ten to twenty-five days after silking, which comprises grinding the sweet corn to the state of a cream, removing husks containing epidermis and other foreign elements from the cream by filtration, mixing the resulting filtrate with at least one member of edible fats and fatty oils while stirring and homogenizing the mixture to form an oil-in-water type emulsion, and thereafter spray drying the said emulsion thereby to produce a dry corn powder.

3. Corn soup mix composition which consists of about 40.0% by weight of corn powder in which individual fat particles are included in such state as coated with a film essentially composed of sweet corn protein and sweet corn amylaceous materials contained in corn, about 20.0% by weight of corn starch, about 28.4% by weight of dried skim milk, about 1.5% by weight of sodium glutamate, about 3.0% by weight of onion powder, about 0.1% by weight of white pepper, and about 5.0% by weight of edible salt.

4. Corn soup mix composition which comprises sweet corn in the powdered form and at least one member of fats and fatty oils, together with other materials including corn starch, onion powder, skim milk, spices and flavors, said composition being characterized by that the fat particles contained therein are individually coated with a film essentially composed of sweet corn protein and sweet corn amylaceous materials in the sweet corn.

5. A method for the preparation of corn soup mix composition, which comprises adding a creamy sweet corn which has been ground and thereafter separated from epidermis and other unground materials with at least one member of fats and fatty oils, stirring the mixture to form an emulsion, mixing uniformly skim milk, flavors, spices and other nutritive substances with the emulsion, spray drying the thus obtained emulsified mixture to give a dry powder, and then intimately mixing the powder with corn starch.

6. A method for the preparation of corn soup mix composition, which comprises frying raw onion with at least one of fats and fatty oils, grinding the fried mass together with sweet corn to a cream, filtering the cream to remove unground materials, mixing the filtrate with skim milk, flavors, spices and other nutritive materials while stirring and heating to form an oil-in-water type emulsion, spray drying this emulsion to give a dry powder, and then intimately mixing the powder with corn starch.

7. A method for the preparation of corn soup mix composition, which comprises intimately mixing (I) a corn powder which contains fat particles being individually coated with a film essentially composed of protein and amylaceous materials contained in corn, with II finely powered roux which has been separately prepared by (a) frying corn starch with edible fat, (b) mixing the fried corn starch with spices and flavors, (c) cooling the mixture to solids and then (d) dividing the solids to a fine powder.

8. A corn powder as described in claim 1, wherein the fat particles have an average size of less than 30 microns.

References Cited in the file of this patent

UNITED STATES PATENTS

| 1,182,263 | Fowler | May 9, 1916 |
| 1,380,815 | Luft | June 7, 1921 |
| 2,471,435 | Kimball et al. | May 31, 1949 |